(12) United States Patent
Takahashi et al.

(10) Patent No.: US 7,607,368 B2
(45) Date of Patent: Oct. 27, 2009

(54) LOCKING ASSEMBLY FOR MOTOR VEHICLE OF SADDLE RIDING TYPE

(75) Inventors: Shinji Takahashi, Wako (JP); Nobuhiko Nakano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 749 days.

(21) Appl. No.: 10/995,563

(22) Filed: Nov. 24, 2004

(65) Prior Publication Data

US 2005/0120763 A1 Jun. 9, 2005

(30) Foreign Application Priority Data

Nov. 25, 2003 (JP) ............................. 2003-394578

(51) Int. Cl.
  F16C 1/10 (2006.01)
  F16C 1/12 (2006.01)
  G05G 1/08 (2006.01)
  B60K 17/00 (2006.01)

(52) U.S. Cl. ..................... 74/501.6; 74/500.5; 74/504; 180/336; 180/908

(58) Field of Classification Search ............... 74/500.5, 74/501.6, 502, 502.2, 504; 70/186, 240; 477/105; 180/215, 219, 292, 336, 230, 908; 280/291; 251/144; 296/37.1; B60K 20/02

See application file for complete search history.

(56) References Cited

U.S. PATENT DOCUMENTS

| | | | | | |
|---|---|---|---|---|---|
| 2,039,093 | A | * | 4/1936 | Lewis | 74/502 |
| 2,571,473 | A | * | 10/1951 | Neracher et al. | 477/105 |
| 3,529,452 | A | * | 9/1970 | Rae | 70/240 |
| 3,954,250 | A | * | 5/1976 | Grace | 251/144 |
| 4,372,416 | A | * | 2/1983 | Igarashi | 180/215 |
| 6,237,710 | B1 | * | 5/2001 | Mori et al. | 180/219 |
| 6,270,106 | B1 | * | 8/2001 | Maki et al. | 280/291 |
| 6,443,276 | B2 | * | 9/2002 | Ahnert et al. | 192/3.56 |
| 6,725,962 | B1 | * | 4/2004 | Fukuda | 180/292 |
| 7,150,341 | B2 | * | 12/2006 | Maeda et al. | 180/336 |
| 2003/0034195 | A1 | | 2/2003 | Rioux et al. | |
| 2005/0034493 | A1 | * | 2/2005 | Wittwer et al. | 70/186 |

FOREIGN PATENT DOCUMENTS

FR 2722752 1/1996

(Continued)

*Primary Examiner*—Vinh T. Luong
(74) *Attorney, Agent, or Firm*—Westerman, Hattori, Daniels & Adrian, LLP

(57) ABSTRACT

A locking assembly for a motor vehicle of a saddle riding type includes, a reverse lock disposed in a transmission of the vehicle for preventing a shift change of the transmission into reverse when the vehicle is traveling forward, and a lock release mechanism having an actuator, wherein the lock release mechanism is disposed in an opening in a front fender of the vehicle, such that the actuator projects above the opening. Further the locking assembly includes a cable operatively connecting the lock release mechanism with the reverse lock, such that actuation of the actuator causes the reverse lock to be released, a main body of the lock release mechanism housed beneath the opening on an underside of the fender for covering the lock release mechanism, and a cover body disposed on the fender, such that sides of the actuator and the opening are covered.

14 Claims, 8 Drawing Sheets

FOREIGN PATENT DOCUMENTS

| | | | |
|---|---|---|---|
| JP | 60-56634 | * | 4/1985 |
| JP | 62-218243 | | 9/1987 |
| JP | 62218243 | | 9/1987 |
| JP | 63-071430 | | 3/1988 |
| JP | 2000-313383 | | 11/2000 |

* cited by examiner

# LOCKING ASSEMBLY FOR MOTOR VEHICLE OF SADDLE RIDING TYPE

FIELD OF THE INVENTION

The present invention relates to a motor vehicle of a saddle riding type having a reverse lock for preventing a shift change of the transmission into reverse while the motor vehicle is traveling forward, and a lock release mechanism for releasing this reverse lock.

RELATED ART

Among motor vehicles of a saddle riding type, a motor vehicle has been in practical use which comprises a reverse lock for preventing a shift change from being made into reverse while the motor vehicle is traveling in the forward direction. With regard to motor vehicles of a saddle riding type in practical use, it suffices in terms of practical use if the motor vehicles are provided with an operation unit for switching between a forward motion mode and a reverse motion mode, and if the operation unit is designed not to switch to a reverse motion mode while the motor vehicle is traveling forward.

In such motor vehicles of a saddle riding type, a motor vehicle has been known which is provided with a lever (an operation unit) for switching between a forward motion mode and a reverse motion mode, the lever being positioned on the right in the vehicle width direction and almost in the middle of the motor vehicle in the vehicle length direction (for example, see Japanese Patent Laid-open Official Gazette No. Hei. 7-80426 (page 5, FIG. 2).

FIG. 9 is a diagram explaining a basic conventional structure. A motor vehicle 200 of a saddle ridding type is a motor vehicle in which a vehicle frame 201 is mounted with an engine 202, the rotation of this engine 202 is shifted by a transmission 203, and the output from this transmission 203 is conveyed to rear wheels 204 and 204. A lever-shaped operation unit 205 for switching the transmission 203 between a forward motion mode and a backward (or reverse) motion mode is provided almost in the middle of the motor vehicle. In the figure, reference numerals 206 and 206 denote front wheels which are mounted to the vehicle frame in a way that the front wheels are rotatable; 207, a front fender covering the front wheels 206 and 206; and 208, a rear fender covering rear wheels 204 and 204.

With regard to the motor vehicle 200 of a saddle riding type, its operability is excellent, since the lever-shaped operation unit 205 for switching between a forward motion mode and a backward motion mode is provided almost in the middle of the motor vehicle. However, in a case where the operation unit 205 is large in size, it brings about a problem in that the aesthetic appearance of the motor vehicle is marred.

In addition, since the motor vehicle 200 of a saddle riding type is a motor vehicle to be driven over rough terrain, mud and the like are splashed onto, and adhered to, the operation unit 205 easily.

In other words, a motor vehicle of a saddle riding type has been awaited which comprises an operation unit, which enables an aesthetic appearance to be improved, and which enables the splashing of water, mud and the like onto it to be prevented.

SUMMARY OF THE INVENTION

An object of the present invention is to provide a motor vehicle of a saddle ridding type whose design can be improved by solving the problem of marring the aesthetic appearance of the motor vehicle, as described above. In addition, another object of the present invention is to provide a motor vehicle of a saddle riding type which can prevent mud and the like from adhering to an operation unit by solving the problem of water, mud and the like being splashed onto the operation unit.

A locking assembly for a motor vehicle of a saddle riding type, in accordance with the instant invention includes, a reverse lock disposed in a transmission of the vehicle for preventing a shift change of the transmission into reverse when the vehicle is traveling forwards, a lock release mechanism having an actuator, the lock release mechanism being disposed in an opening in a front fender of the vehicle, such that the actuator projects above the opening, a cable operatively connecting the lock release mechanism with the reverse lock, such that actuation of the actuator causes the reverse lock to be released a main body of the lock release mechanism housed beneath the opening on an underside of the fender for covering the lock release mechanism, and a cover body disposed on the fender, such that sides of the actuator and the opening are covered.

For example, if the lock release mechanism can be installed in the front fender in a compact form, it is preferable in terms of improving the aesthetic appearance (design) of the motor vehicle. If splashing of water, mud and the like onto the operation unit (actuator) can be prevented, it is preferable since it allows the motor vehicle to be freely driven over rough terrain.

With this taken into consideration, the opening is provided to the front fender for the purpose of accepting the lock release mechanism therein and the main body of the lock release mechanism is housed underneath the opening. Concurrently, the actuator (or operation unit) of the lock release mechanism is caused to extend upwardly by from the opening, and the sides of the actuator and the opening are covered by the cover body.

In other words, the opening is provided in the front fender for the purpose of accepting the lock release mechanism in the front fender, and the main body of the lock release mechanism is housed underneath the opening on the underside of the fender, and concurrently the actuator of the lock release mechanism is caused to extend upwardly from the opening, thereby installing the lock release mechanism in the front fender in a compact form.

In addition, the sides of the actuator and the opening are covered with the cover body, thereby preventing the splashing of water, mud and the like on the actuator.

Further, the front fender is interposed between the cover body and the main body, and the lock release mechanism is disposed in the front fender by fastening the main body to the cover body.

The front fender is interposed between the cover body and the main body, and the lock release mechanism is disposed in the front fender by fastening the main body to the cover body, thereby enabling a bracket and a stay for exclusive use to be eliminated, for example when the lock release mechanism is installed thereto.

Further, the lock release mechanism is provided in a position on the right fender which allows a driver to operate the lock release mechanism with his right hand.

In general, a clutch is operated with the left hand. For this reason, the lock release mechanism is provided in a position which allows a driver to operate the lock release mechanism with his right hand, thereby making it easy to perform an operation of switching between a forward motion mode and a reverse motion mode.

Additionally, the main body is covered with a mud cover for preventing the splashing of water, mud and the like onto the main body.

The main body is covered with a mud cover for preventing the splashing of water, mud and the like onto the main body, and thereby reducing unevenness on the underside of the front fender.

An opening is provided in the front fender for the purpose of accepting the lock release mechanism in the front fender, the main body of the lock release mechanism is housed underneath the opening, and the actuator of the lock release mechanism extends upwardly from the opening, thereby enabling the lock release mechanism to be installed in the front fender in a compact form. As a result, this brings about advantages that the space efficiency concerning the front fender can be improved, and that the aesthetic appearance (design) of the motor vehicle can also be improved.

In addition, the sides of the actuator are covered with the cover body, thereby preventing mud and the like from splashing onto the actuator. As a result, it brings about an advantage that the motor vehicle can be freely driven over rough terrain.

Also, the front fender is interposed between the cover body and the main body, and the lock release mechanism is installed in the front fender by fastening the main body to the cover body, thereby enabling a bracket and a stay for exclusive use to be eliminated, for example when the lock release mechanism is installed in the fender. As a result, this brings about an advantage that the number of parts can be reduced.

Further, in general, the clutch is operated with the left hand in many cases, and the lock release mechanism is provided in a position which allows a user to operate the lock release mechanism with the right hand, thereby enabling an operation of switching between a forward motion mode and a reverse motion mode to be performed with ease. As a result, this brings about an advantage that the operability in the operation of switching between a forward motion mode and a reverse motion mode can be improved.

Additionally, the main body is covered with the mud cover for preventing water, mud and the like from splashing onto the main body, and thereby enabling unevenness on the underside of the front fender to be reduced. As a result, this brings about an advantage that the amount of mud adhered to the front fender can be reduced.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
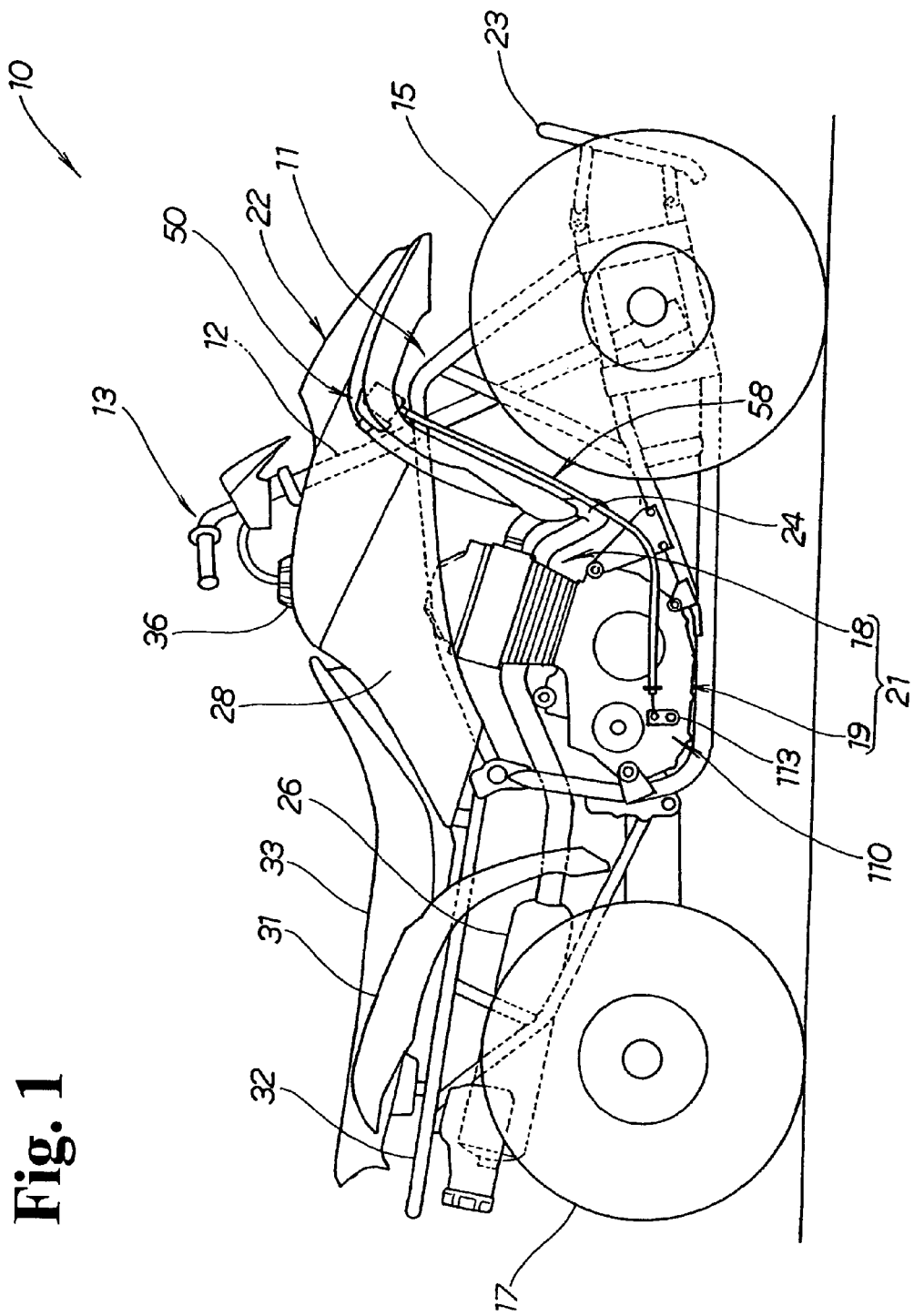
FIG. 1 is a right side view of a motor vehicle of a saddle riding type according to the present invention.

A description will be provided below for preferred embodiments to carry out the present invention with reference to the attached drawings. Incidentally, each drawing has to be looked at in the direction in which reference numerals have been written.

FIG. 1 is a right side view of a motor vehicle 10 of a saddle riding type according to the present invention. The motor vehicle 10 of a saddle riding type is a vehicle for being driven over rough terrain. In the motor vehicle 10, a handle bar post 12 is installed to the front section of the vehicle frame 11, and a handle bar 13 is installed onto the handle bar post 12 in a way that the handle bar 13 can be rotated. Front wheels 14 and 15 as right and left wheels (only the front wheel 15 on this side is illustrated) are installed on the lower end of the front section of the vehicle frame 11 in a way that the wheels 14 and 15 can rotate. Right and left rear wheels 16 and 17 (only the rear wheel 17 on this side is illustrated) are installed to the lower end of the rear section of the vehicle frame 11 in a way that the right and left rear wheels 16 and 17 can rotate. A power unit 21 constituting of an engine 18 and a transmission 19 is installed to the middle of the vehicle frame 11 in order to drive front wheels 14 and 15 as well as rear wheels 16 and 17.

In other words, the motor vehicle 10 of a saddle riding type is a four-wheel-drive buggy, and is classified as an ATV (All-Terrain Vehicle). Since the body of the motor vehicle 10 of a saddle riding type is light in weight and compact in size, and since the motor vehicle 10 of a saddle riding type is a motor vehicle capable of hard cornering and with easy operability, the motor vehicle 10 of a saddle riding type is an off-road vehicle suitable for transportation in agriculture, livestock farming, hunting, safety surveillance and the like, as well as for leisure activities.

In addition, the motor vehicle 10 of a saddle riding type is a motor vehicle including a: reverse lock (or locking means) 110 which is provided on the side of the transmission 19 for the purpose of preventing a shift change of transmission 19 into reverse (backward running) while the motor vehicle 10 is traveling forward, and a lock release mechanism 50 which is provided on the side of the front fender 22 for the purpose of releasing the reverse lock 110 through a cable 58.

In the figure, reference numeral 23 denotes a front guard for protecting the front section of the vehicle body; 24, an exhaust pipe connected to the front portion of the engine 18; 26, a silencer (muffler) connected to the exhaust pipe; 28, a side cover; 31, a rear fender; 32, a seat rail extended from the right and left of the vehicle body frame 11 to the rear; 33, a seat; and 36, a fuel tank cap.

Figure 2:
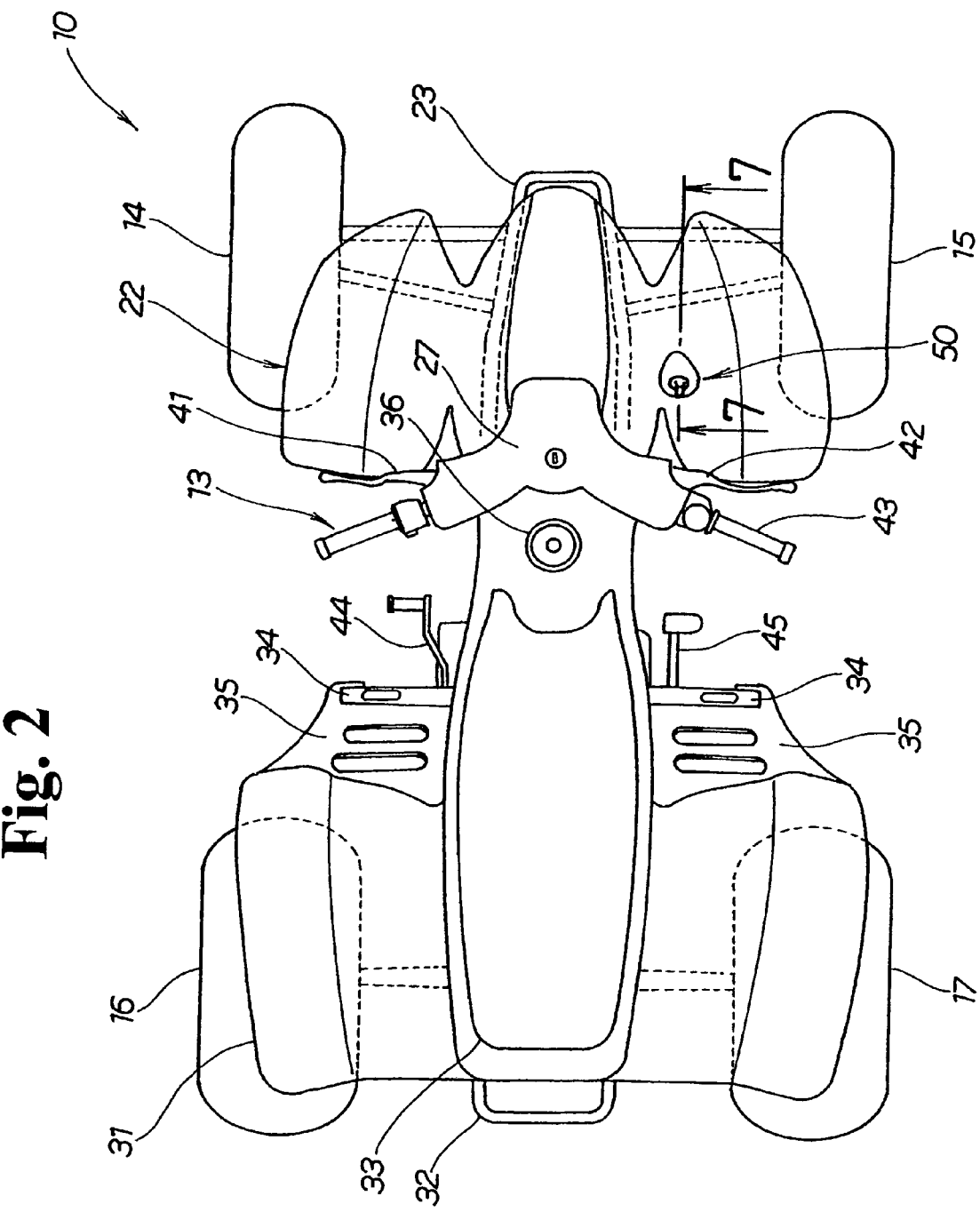
FIG. 2 is a plan view of the motor vehicle of a saddle riding type according to the present invention.

FIG. 2 is a plan view of the motor vehicle 10 of a saddle riding type according to the present invention. Reference numeral 27 denotes a handle bar cover; 34 and 34, step bars; 35 and 35, floor steps; 41, a clutch lever; 42, a brake lever for braking the front wheels 14 and 15; 43, an accelerator provided to the handle bar 13; 44, a shift change pedal for choosing between a forward motion mode and a reverse motion mode of the transmission 19, and for selecting a transmission gear ratio thereof; and 45, a brake pedal for braking the rear wheels 16 and 17.

With the motor vehicle 10 of a saddle riding type, the clutch (not illustrated) is disconnected by grasping the clutch lever 41 with the left hand, and a transmission gear ratio of the transmission 19 is selected by operating the shift change pedal 44 with the left foot, thereby enabling the motor vehicle 10 to be driven forward. In addition, the front wheels 14 and 15 are braked by grasping the brake lever 42 with the right hand, and the rear wheels 16 and 17 are braked by stepping on the brake pedal 45 with the right foot, thereby enabling the motor vehicle 10 to be stopped. Furthermore, the clutch lever 41 is grasped with the left hand in a state that the motor vehicle 10 is stopped for a period, and an actuator knob 51 of the actuator of the lock release mechanism 50 is turned to the right by a quarter rotation with the right hand, and the transmission 19 is set to reverse by operating the shift change pedal 44 with the left foot, and the accelerator 43 is operated with the right hand, thereby enabling the motor vehicle 10 to be driven backward.

It can be said that the motor vehicle 10 of a saddle riding type is a motor vehicle in which the lock release mechanism 50 is provided in a position which allows a driver to operate the lock release mechanism 50 with the right hand, or on the right side of the front fender 22.

In general, in this type of vehicle, the clutch is operated with the left hand. For this reason, the lock release mechanism 50 is provided in a position which allows a driver to operate the lock release mechanism 50 with the right hand, thereby enabling an operation of switching between a forward motion mode and a reverse motion mode to be performed with ease (in a simple manner). As a result, the operability in the operation of switching between a forward motion mode and a reverse motion mode can be improved.

Figure 3:
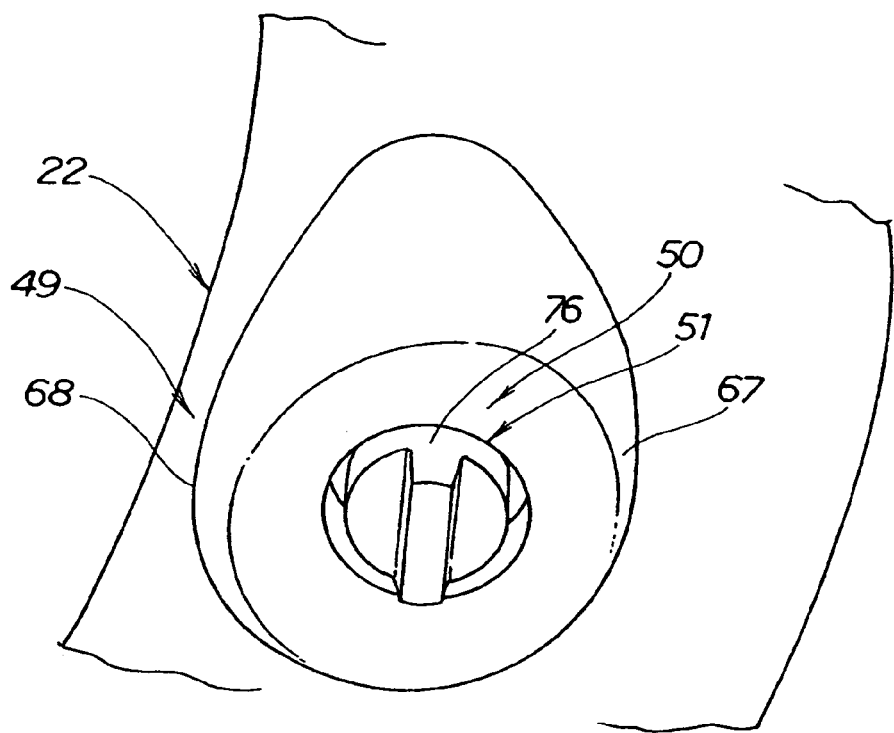
FIG. 3 is a perspective view showing an actuator of a lock release mechanism of the motor vehicle of a saddle riding type according to the present invention.
Figure 4:
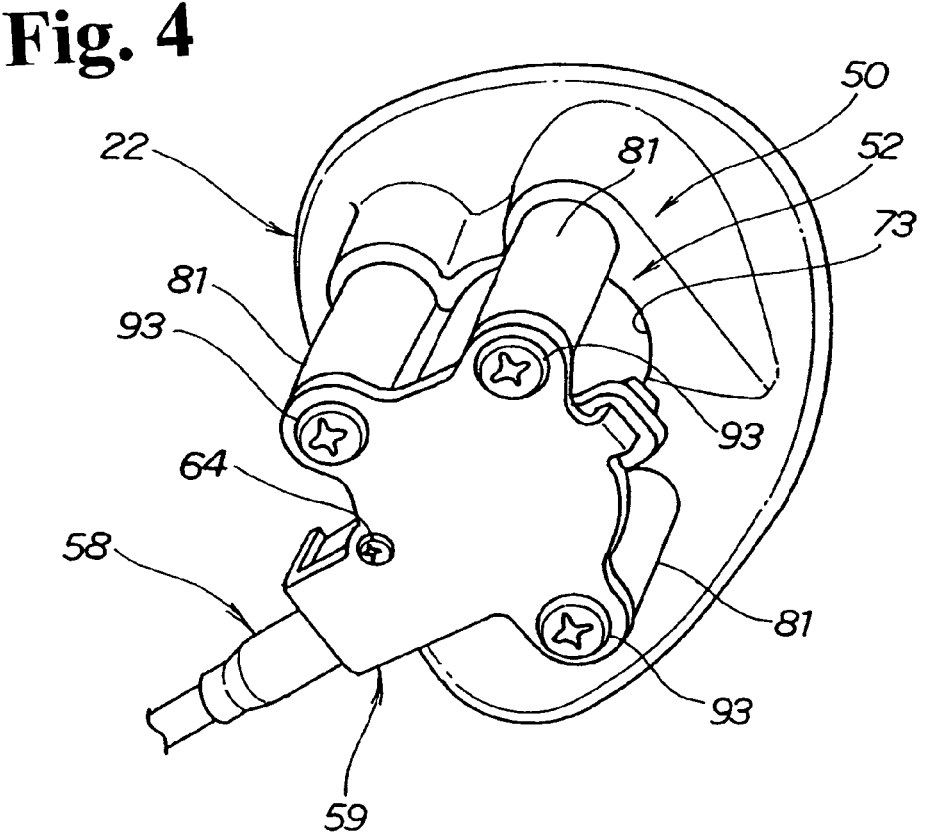
FIG. 4 is a perspective view showing a main body of the lock release mechanism of the motor vehicle of a saddle riding type according to the present invention.

FIG. 3 is a perspective view showing an actuator 51 of the lock release mechanism 50 of the motor vehicle 10 of a saddle riding type according to the present invention. FIG. 4 is a perspective view showing a main body 52 of the lock release mechanism 50 of the motor vehicle 10 of a saddle riding type according to the present invention.

The motor vehicle 10 of a saddle riding type is a motor vehicle in which an opening 73 is provided, (shown in FIG. 4), through which to install the lock release mechanism 50 in the front fender 22, and the main body 52 of the lock release mechanism 50 is housed underneath this opening 73, and an actuator knob (actuator) 51, shown in FIG. 3, of the lock release mechanism 50 is caused to extend upwardly from the opening 73, thereby installing the lock release mechanism 50 in a front fender 22 in a compact form. In addition, the sides of the actuator knob (actuator) 51 are covered with a cover body 49 shown in FIG. 3, thereby preventing the splashing of water, mud and the like onto the actuator knob 51. Furthermore, a cable 58 is extended out from the main body 52 to a transmission 19 shown in FIG. 1, and the transmission 19 is at the extremity of the cable 58, thereby remotely controlling the reverse lock 110.

Figure 5:
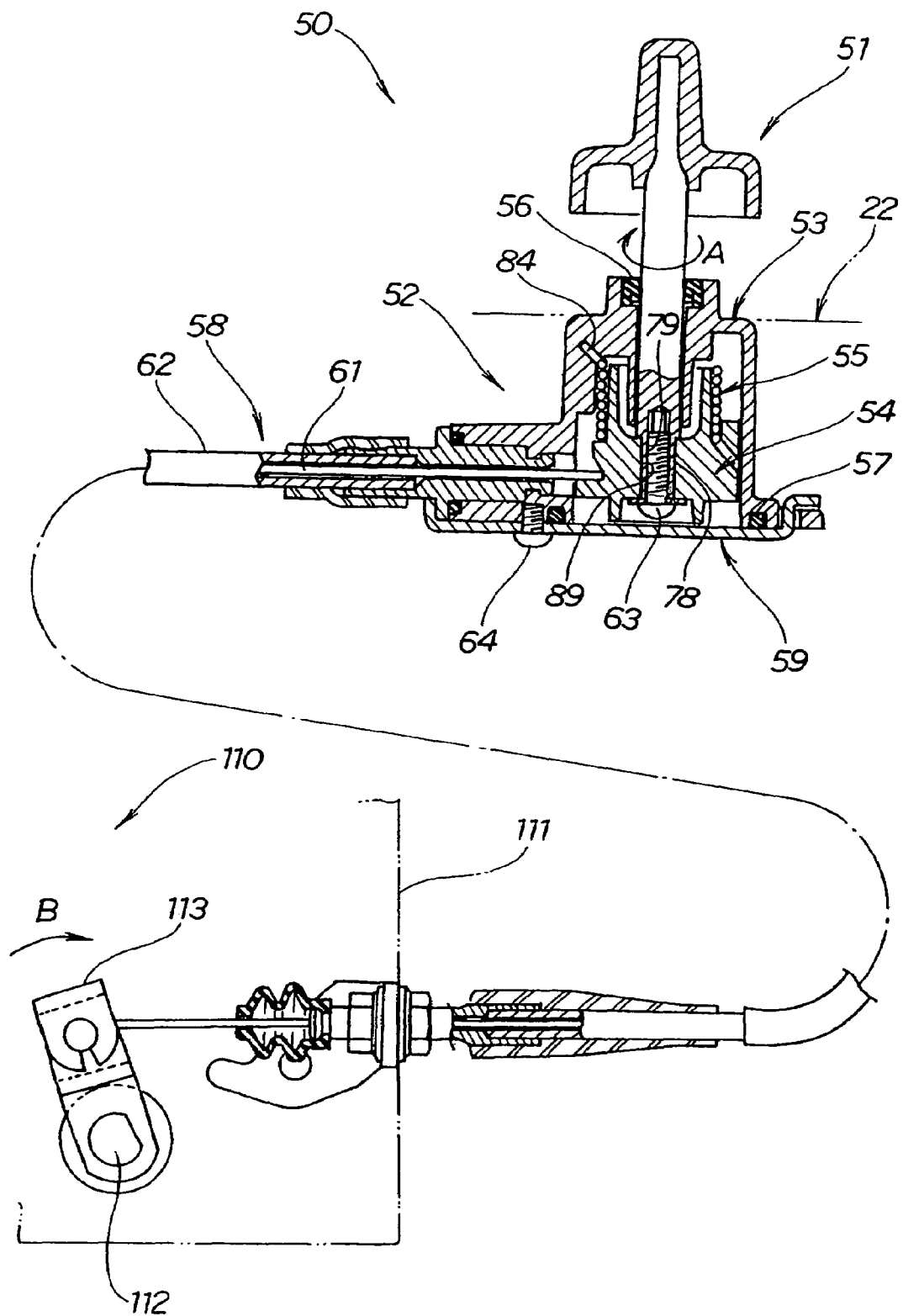
FIG. 5 is an explanatory view of the lock release mechanism and reverse lock of the motor vehicle of a saddle riding type according to the present invention.

FIG. 5 is an explanatory diagram of the lock release mechanism 50 and the reverse lock 110 of the motor vehicle 10 of a saddle riding type according to the present invention.

The lock release mechanism 50 is constituted of the actuator knob (actuator) 51 which is caused to extend upwardly from the front fender 22 and the main body 52 housed underneath the front fender 22.

The main body 52 includes, a housing 53 to be installed to the front fender 22, a revolving spool (revolving drum) 54 housed in this housing 53 in a way that the revolving spool (revolving drum) can revolve, a restoring spring 55 interposed between revolving spool 54 and housing 53, a dust seal 56 with which the interstices between the actuator knob 51 and the housing 53 are sealed, and a bracket 59 which is installed to the housing 53 with an o-ring 57 interposed between the bracket 59 and the housing 53, and which supports the cable 58 extended from the revolving spool 54. Incidentally, a rotation angle of the actuator knob 51 is set in a range of 45 degrees to 90 degrees by adjusting the play of the cable 58. In the present embodiment, it is assumed that the rotation angle is set at 65 degrees.

In the figure, reference numeral 61 denotes an inner wire of the cable 58; 62, an outer tube of the cable 58; 63, a screw with which the operation knob 51 is fastened to the revolving spool 54; and, 64, a fitting screw with which the bracket 59 is fastened to the housing 53.

In other words, the lock release mechanism 50 is a mechanism in which the revolving spool 54 is installed to the actuator knob 51, the cable 58 is coiled around the revolving spool 54, this cable 58 is extended from the housing 53, and the extremity of the cable 58 is connected to an operation lever 113 of the reverse lock 110 which is provided to the side of the transmission 19. The reverse lock 110 is released by rotating the actuator knob 51 in the direction shown by an arrow A, and by rotating the operation lever 113 in the direction shown by an arrow B, thereby allowing a shift change to be made into reverse (backward traveling).

By releasing the actuator knob 51, the restoring function (elastic or biasing function) of the restoring spring 55 interposed between the housing 53 and the revolving spool 54 can return the lock release mechanism 50 and the reverse lock 110 to the initial condition, in which the reverse lock is in a locked position in which reverse gear cannot be engaged.

Figure 6:
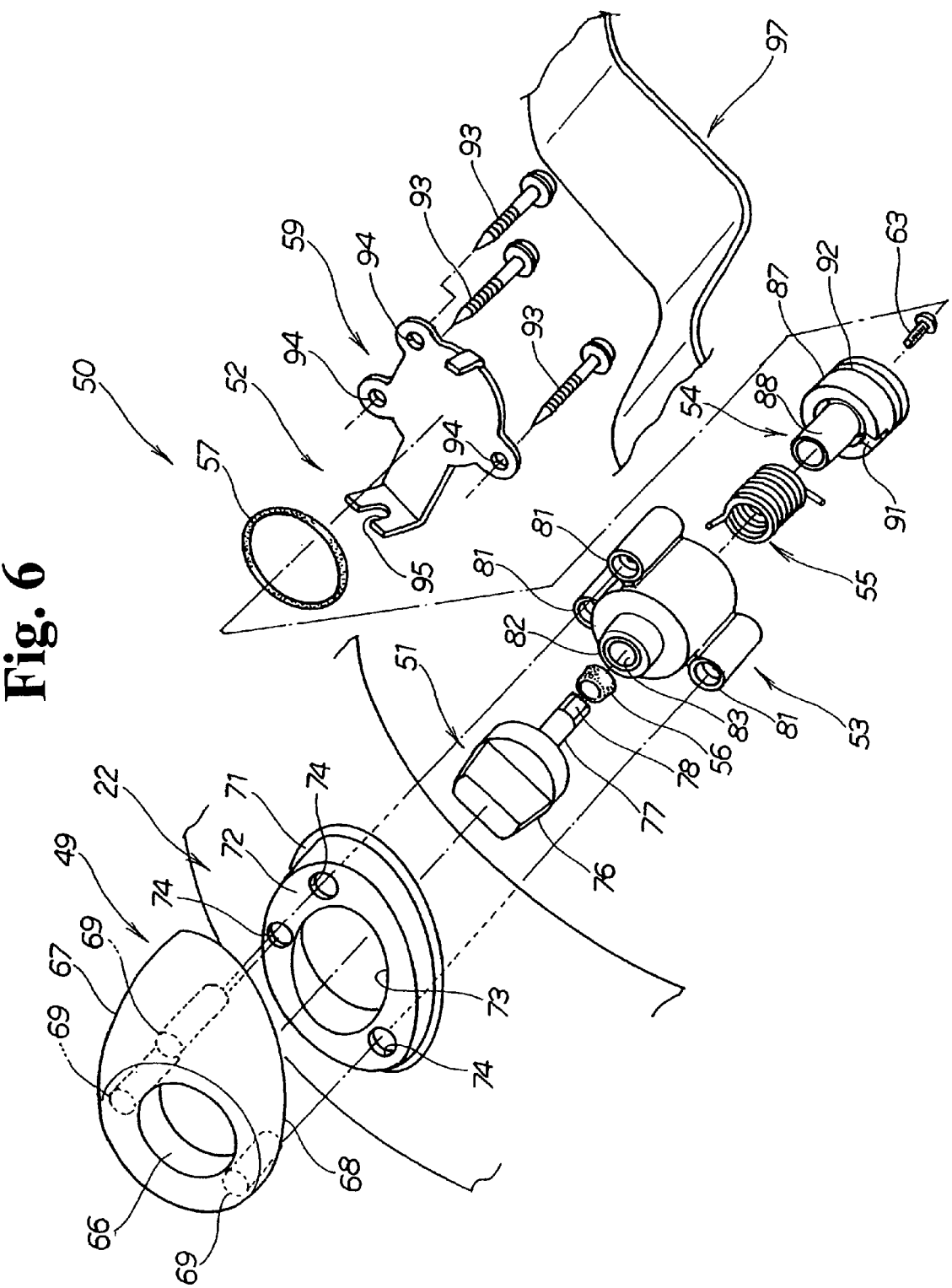
FIG. 6 is an exploded, perspective view of main components related to the lock release mechanism of the motor vehicle of a saddle riding type according to the present invention.

FIG. 6 is an exploded, perspective view of main components related to the lock release mechanism 50 of the motor vehicle 10 of a saddle riding type according to the present invention.

Cover body 49, includes a through hole through which the actuator knob 51 is caused to penetrate, a covering portion 67 for covering the sides (outer periphery) of the operation knob 51, an edge portion 68 which is caused to contact the front fender 22, and screw fitting bosses 69, . . . ( . . . means a plurality) through which the main body 52 and the front fender 22 are fastened jointly.

The front fender includes a concave portion 71 which has the same shape as the edge portion 68 of the covering body 49, a receiving portion 72 for receiving the housing 53, the receiving portion 72 being formed in a way that it extends out from this concave portion 71, an opening 73 which is made in the receiving portion 72, and which, thereby, the actuator knob 51 is caused to penetrate through, and insertion holes 74, . . . which are made in the receiving portion 72, and which, thereby, the screw fitting bosses 69, . . . are inserted into.

In other words, the concave portion 71 which has the same shape as the edge portion 68 of the cover body 49 are provided to the front fender 22, thereby enabling the edge portion 68 of the cover body 49 to be positioned in this concave portion 71. As a result, conditions in which the lock release mechanism 50 and the cover body 49 are fastened thereto is improved, and the convenience with which the lock release mechanism 50 and the cover body 49 are fastened thereto is enhanced.

Actuator knob 51, includes, a tab 76 which is held with a thumb and a forefinger, an extended portion 77 which is extended from this tab 76, and which is formed as a portion separate from the extended portion 76, a spool fitting portion 78 which is formed at the extremity of the extended portion 77 in a way such that the spool fitting portion 78 is shaped like an oval when viewed cross-sectionally, and which, thereby, is caused to fit into the revolving spool 54; and a stop hole 79 (see FIG. 5) which is made in the lower surface of the spool fitting portion 78, and which, thereby, a stop screw 63 is fastened to the spool fitting portion 78.

Housing 53, includes boss portions 81, which are fastened jointly to the front fender 22 and the covering body 49 with fitting screws, a seal fitting portion 82 in which the dust seal 56 is fitted, a support cylinder 83 for supporting the operation knob 51 in a way that the operation knob 51 can rotate, and a one-end holding portion 84 (see FIG. 5) for holding one end of the restoring spring 55.

The revolving spool 54 includes, an outer cylinder portion 87 which is installed to the housing 53 in a way that the outer cylinder portion 87 can rotate, an inner cylinder portion 88 for supporting the restoring spring 55, a fitting hole 89 (see FIG. 5) to which the operation knob 51 is fitted, and which is shaped like an oval when viewed cross-sectionally, a the-other-end holding portion 91 for holding the other end of the restoring spring 55, and a cable coiling portion 92 around which the cable 58 is coiled.

The bracket 59 includes, holes 94, through which fitting screws 93, are caused to penetrate, the fitting screws 93 with which the bracket 59, the housing 53, the front fender 22 and the covering body 49 are fastened jointly; and a cable support portion 95 for supporting the cable 58 (see FIG. 5).

A mud cover 97 is also a member which prevents the splashing of water, mud and the like onto the housing 53 and the bracket 59, and which also reduces unevenness on the underside of the front fender 22.

Figure 7:
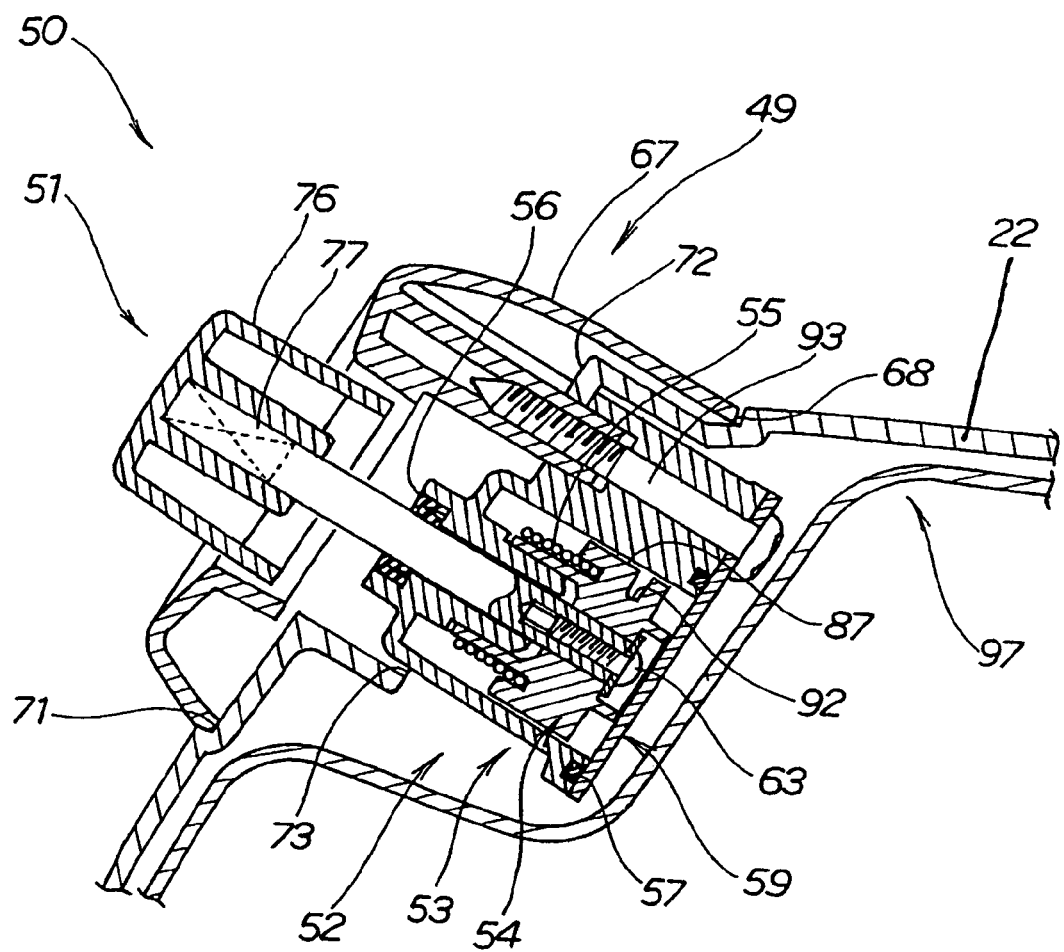
FIG. 7 is a cross-sectional view taken along the 7-7 line in FIG. 2.

FIG. 7 is a cross sectional view taken along the 7-7 line in FIG. 2, and shows the side cross-section of the lock release mechanism 50.

The motor vehicle 10 of a saddle riding type (see FIG. 1) includes the reverse lock 110 (see FIG. 1) which is provided on the side of the transmission 19 for the purpose of preventing a shift change into reverse while the motor vehicle 10 is traveling forward, and the lock release mechanism 50 which is provided on the side of the front fender 22 for the purpose of releasing the reverse lock 110 through the cable 58. In the motor vehicle 10 of a saddle riding type, the opening 73 is provided in the front fender 22 for the purpose of accepting the lock release mechanism 50 in the front fender 22, the main body 52 of the lock release mechanism 50 is housed underneath this opening 73, the actuator knob (actuator) 51 is caused to extend upwardly from the opening 73, and the sides of this operation knob 51 and the opening 73 (around the actuator knob 51) are covered with the covering body 49.

For example, if the lock release mechanism 50 can be installed to the front fender 22 in a compact form, it is preferable in terms of improving the aesthetic appearance (design) of the motor vehicle 10. If the splashing of water, mud the like onto actuator 51 can be prevented, it is preferable since the motor vehicle 10 can be freely driven over rough terrain.

In other words, the opening 73 is provided in the front fender 22 for the purpose of accepting the lock release mechanism 50, the main body 52 of the lock release mechanism 50 is housed underneath this opening 73, and the actuator knob (actuator) 51 is caused to extend upwardly from the opening 73, thereby enabling the lock release mechanism 50 to be installed in the front fender 22 in a compact form. As a result, the space efficiency concerning the front fender 22 can be improved, and the aesthetic appearance (design) of the motor vehicle 10 can also be improved.

In addition, the sides of the actuator knob (actuator) 51 and the opening 73 are covered with the covering body 49, thereby enabling the splashing of water, mud and the like onto actuator 51 to be prevented. As results, the motor vehicle can be driven over rough terrain.

It can be said that, in the motor vehicle 10 of a saddle riding type (see FIG. 1), the front fender 22 is interposed between the cover body 49 and the main body 52, and that the lock release mechanism 50 is installed on the front fender 22 by fastening the main body 52 to the cover body 49.

The front fender 22 is interposed between the cover body 49 and the main body 52, and the lock release mechanism 50 is installed on the front fender 22 by fastening the main body 52 to the cover body 49, thereby, for example, enabling the bracket and the stay for exclusive use to be eliminated when the lock release mechanism 50 is installed. As a result, the number of parts can be reduced.

It can be said that, in the motor vehicle 10 of a saddle riding type (see FIG. 1), the main body 52 is covered with the mud cover 97 for preventing the splashing of water, mud and the like onto the main body.

The main body 52 is covered with the mud cover 97 for preventing the splashing of water, mud and the like onto the main body 52, thereby enabling the splashing of water, mud and the like onto the main body to be prevented, and thereby enabling unevenness on the underside side of the front fender to be reduced. As result, the amount of mud adhering to the front fender 22 can be reduced.

Figure 8:
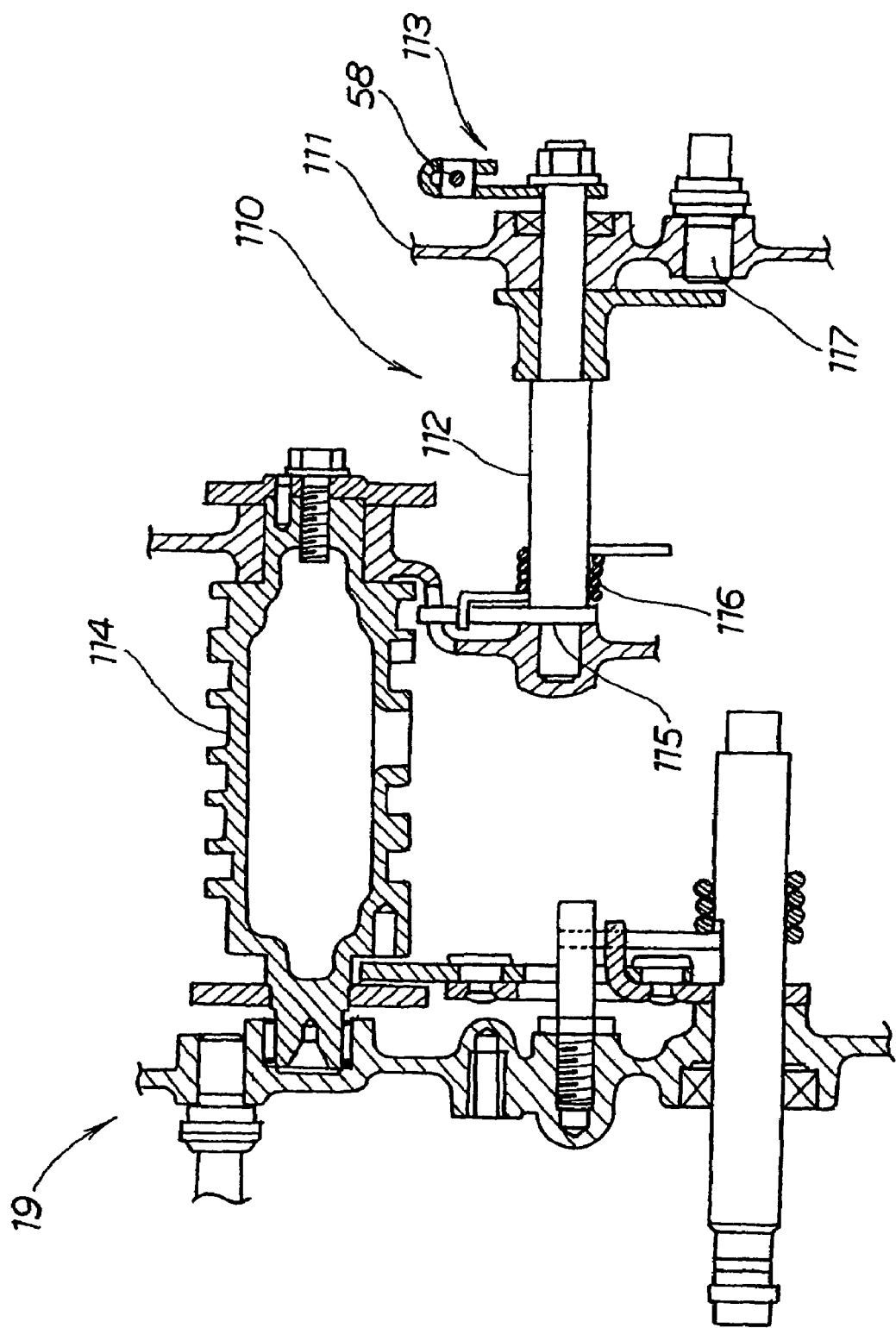
FIG. 8 is a cross-sectional view illustrating a structure of the reverse lock of the motor vehicle of a saddle riding type according to the present invention.
Figure 9:
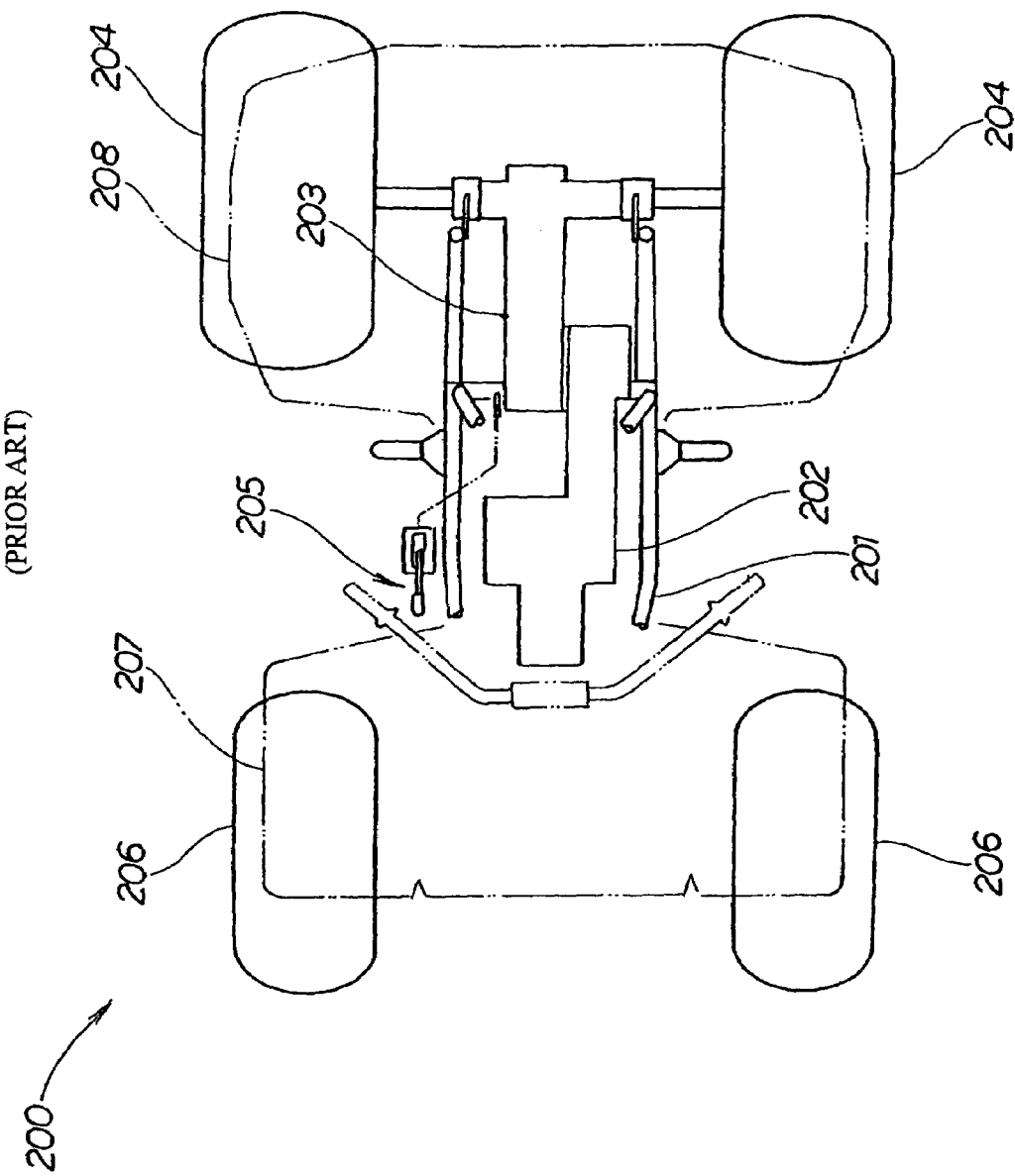
FIG. 9 is a plan view illustrating a basic conventional structure of a saddle riding type motor vehicle.

FIG. 8 is a cross-sectional view illustrating a structure of the reverse lock 110 of the motor vehicle 10 of a saddle riding type according to the present invention. The reverse lock 110 includes, a rotating shaft 112 which is installed in a transmission case 111 in a way that the rotating shaft can rotate, an operation lever 113 which is connected with the extremity of the cable 58 by installing the operation lever 113 to one end of this rotating shaft 112, a stopper arm 115 for restricting a rotation of the drum 114 for displacing a transmission gear (not illustrated) to a predetermined position by installing the stopper arm 115 to the other end of the rotating shaft 112; a torsion spring 116 for energizing the rotating shaft 112 in a predetermined direction by causing the torsion spring 116 to be interposed between this stopper arm 115 and the transmission case 111; and a detection switch 117 for detecting the rotation of the rotating shaft 112, and for detecting the condition of the stopper arm 115. The reverse lock 110 is to prevent a shift change from being made into reverse by restricting the rotation of the drum 114.

Incidentally, the motor vehicle 10 of a saddle riding type according to the present invention is a four-wheeled vehicle, as shown in FIG. 2. However, the motor vehicle is not limited to this. The motor vehicle 10 of a saddle riding type may be a three-wheeled vehicle.

With regard to the motor vehicle 10 of a saddle riding type according to the present invention, the operation unit is the actuator knob 51, as shown in FIG. 4. However, the actuator is not limited to this. The actuator may be what is shaped, for example, like a lever.

With regard to the motor vehicle 10 of a saddle riding type according to the present invention, the tab 76, and the extended portion 77, of the actuator knob 51 are formed as separated bodies, as shown in FIG. 7. However, the tab 76 and the extended portion 77 are not limited to this. The tab 76, and the extended portion 77, of the operation knob 51 may be formed integrally.

With regard to the motor vehicle 10 of a saddle riding type according to the present invention, the rotation angle of the actuator knob 51 is set at 65 degrees. However, the rotation angle of the actuator knob 51 is not limited to this. The rotation angle of the actuator knob 51 may be an arbitrary angle by which the actuator knob 51 rotates.

The motor vehicle 10 of a saddle riding type according to the present invention is suitable as an all-terrain vehicle for enjoying sport driving.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A locking assembly for a motor vehicle of a saddle riding type, said locking assembly comprising:
    a reverse lock disposed in a transmission of the vehicle for preventing a shift change of the transmission into reverse when the vehicle is traveling forward;
    a lock release mechanism having an actuator, said lock release mechanism being disposed in an opening in a front fender of the vehicle, said fender being disposed on a laterally opposite side of said vehicle with respect to a clutch lever, such that said actuator projects above the opening, and wherein said lock release mechanism is operable by a right hand of a driver of the vehicle;
    a cable operatively connecting said lock release mechanism with said reverse lock, such that actuation of said actuator causes said reverse lock to be released;
    a main body of said lock release mechanism housed adjacent the opening on an underside of the fender for covering an underside of said lock release mechanism and completely housing said operative connection of said cable with said lock release mechanism; and
    a cover body disposed on said fender, such that sides of said actuator and the opening are covered.

2. The locking assembly for a motor vehicle of a saddle riding type, according to claim 1, further comprising one or more fasteners, which extend from said main body to said cover body to fasten said main body and said cover body together, such that the fender is interposed therebetween.

3. The locking assembly for a motor vehicle of a saddle riding type, according to claim 2, wherein said one or more fasteners are screws.

4. The locking assembly for a motor vehicle of a saddle riding type, according to claim 1, further comprising a mud cover, covering said main body on the underside of said fender for preventing splashing of mud and water onto said main body.

5. The locking assembly for a motor vehicle of a saddle riding type, according to claim 1, wherein said actuator has a rotary actuator knob, such that upon rotary motion of said rotary actuator knob, said cable is shifted in its axial direction.

6. The locking assembly for a motor vehicle of a saddle riding type, according to claim 1, wherein said lock release mechanism includes a biasing spring for biasing said actuator to a position in which said reverse lock is in a locked position.

7. The locking assembly for a motor vehicle of a saddle riding type, according to claim 1, wherein said reverse lock is disposed on a side of the transmission.

8. The locking assembly for a motor vehicle of a saddle riding type, according to claim 1, wherein said cover body includes a receiving portion engaging the fender.

9. The locking assembly for a motor vehicle of a saddle riding type, according to claim 1, further comprising a shift change pedal, disposed on a left side of the vehicle, which selects forward and reverse states of the transmission, as well as gear ratio.

10. A locking assembly for a motor vehicle of a saddle riding type, said locking assembly comprising:
    a reverse lock disposed on a side of a transmission of the vehicle for preventing a shift change of the transmission into reverse when the vehicle is traveling forward;
    a lock release mechanism having an actuator, said lock release mechanism being disposed in an opening in a right front fender of the vehicle, on a laterally opposite side of said vehicle with respect to a clutch lever, such that said actuator projects above the opening;
    a cable operatively connecting said lock release mechanism with said reverse lock, such that actuation of said actuator causes said reverse lock to be released, and wherein said actuator has a rotary actuator knob, such that upon rotary motion of said rotary actuator knob, said cable is shifted in its axial direction, thereby operating said reverse lock;
    a main body of said lock release mechanism housed adjacent the opening on an underside of the fender for covering an underside of said lock release mechanism and completely housing said operative connection of said cable with said lock release mechanism;
    a cover body disposed on said fender, such that sides of said actuator and the opening are covered;
    one or more fasteners, which extend from said main body to said cover body to fasten said main body and said cover body together, such that the fender is interposed therebetween; and
    a mud cover, covering said main body on the underside of said fender for preventing splashing of mud and water on said main body.

11. The locking assembly for a motor vehicle of a saddle riding type, according to claim 10, wherein said lock release mechanism includes a biasing spring for biasing said actuator to a position in which said reverse lock is in a locked position.

12. The locking assembly for a motor vehicle of a saddle riding type, according to claim 10, wherein said one or more fasteners are screws.

13. The locking assembly for a motor vehicle of a saddle riding type, according to claim 10, wherein said cover body includes a receiving portion engaging the fender.

14. The locking assembly for a motor vehicle of a saddle riding type, according to claim 10, further comprising a shift change pedal, disposed on a left side of the vehicle, which selects forward and reverse states of the transmission, as well as gear ratio.

* * * * *